H. D. JAMES.
CIRCUIT INTERRUPTING DEVICE.
APPLICATION FILED SEPT. 1, 1917.

1,371,561.  Patented Mar. 15, 1921.

WITNESSES:

INVENTOR
Henry D. James
BY
ATTORNEY

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING DEVICE.

1,371,561.  Specification of Letters Patent.  Patented Mar. 15, 1921.

Application filed September 1, 1917. Serial No. 189,388.

*To all whom it may concern:*

Be it known that I, HENRY D. JAMES, a citizen of the United States, and a resident of Edgewood Park, in the county of Allegheny and State of Pennsylvania, have invented a new and useful Improvement in Circuit-Interrupting Devices, of which the following is a specification.

My invention relates to circuit-interrupting devices and particularly to low-voltage tripping devices therefor.

One object of my invention is to provide a low-voltage tripping device that shall be retarded in its operation.

Another object of my invention is to provide a tripping device of the above indicated character that shall be simple and inexpensive to construct and effective in its operation.

Copending U. S. application, Serial No. 114,162, filed August 10, 1916, by Paul MacGahan and assigned to the Westinghouse Electric and Manufacturing Company, discloses a system of distribution that is adapted to be disconnected from its source of supply when an arcing ground obtains therein and to be immediately re-connected before the apparatus, that is connected to the system, falls out of synchronism. Such an arrangement will effectively extinguish the arcing ground, but, when the voltage of the system is reduced, by reason of the system being disconnected from the source of supply, the low-voltage tripping devices of the various auxiliary circuit interrupters will function to disconnect the load circuits from the system.

Since it is desirable to preclude the interruption of the load circuits and, consequently, the operation of the various motors and other similar devices, I provide a low-voltage tripping device that shall be so lagged or retarded in its operation that its interrupter will not function until a predetermined interval of time after the voltage is reduced. This interval of time, is, of course, of sufficient value to preclude the interruption of the load circuits during the time the system is disconnected from the source of energy.

Figure 1:
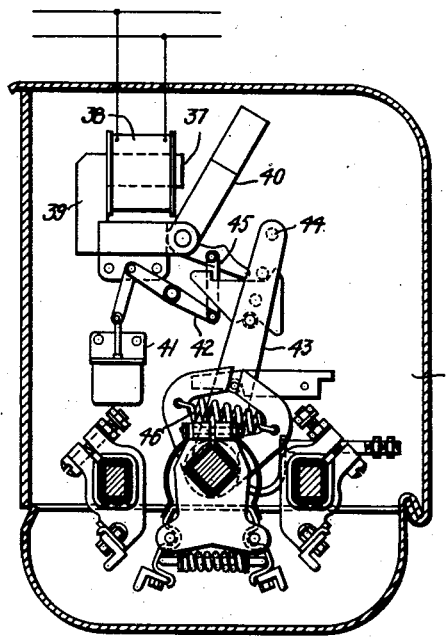
Figure 2:
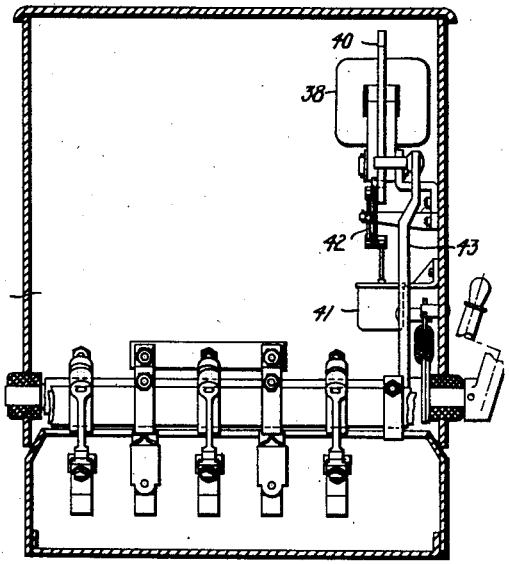
Figure 3:
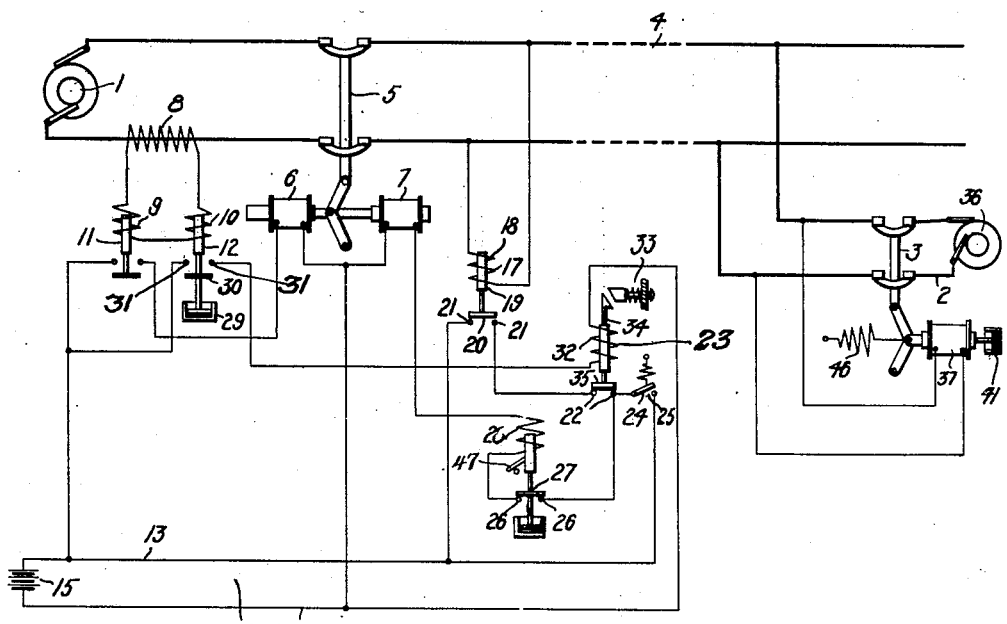

In the accompanying drawings, Figure 1 is a side view, partially in elevation and partially in section, of a circuit interrupter embodying my invention; Fig. 2 is a front view, partially in elevation and partially in section, of the circuit interrupter shown in Fig. 1, and Fig. 3 is a diagrammatic view of a system of distribution illustrating one application of my invention.

A generator 1 supplies energy to the load circuit 2 of a distributing system or circuit 4 that is provided with an interrupter 5 which is adapted to be tripped when an overload or an arcing ground obtains upon the circuit 4 and to be immediately reclosed in order that the load which is connected to the circuit 2 shall not fall out of synchronism. That is, if the circuit interrupter 5 is tripped, the voltage upon the load end of the circuit 4 is reduced substantially to zero, and if the overload is caused by an arcing ground, the arc will be extinguished because of the lack of voltage to maintain it.

The load circuit 2 is provided with a circuit interrupter 3 that is adapted to be tripped a predetermined interval of time after the voltage across the circuit 2 is reduced to a predetermined value. This interval of time is equal to, or greater than, the time interval between the opening and closing of the interrupter 5.

The circuit interrupter 5 is provided with a tripping electromagnet 6 and a closing electromagnet 7. A series transformer 8 is operatively connected to the circuit 4 and is adapted to energize the windings 9 and 10 of overload relays 11 and 12, respectively. The overload relay 11 is adapted to operate instantaneously, upon the occurrence of an overload, for the purpose of completing a circuit from one conductor 13 of a circuit 14, comprising a source 15 of electromotive force, through the tripping electromagnet 6 to the other conductor 16 of the circuit 14. Thus, when an overload obtains upon the circuit 4, the interrupter 5 will be tripped.

A no-voltage relay 17 is adapted to be connected across the conductors of the circuit 4 on the load side of the interrupter 5 and comprises a winding 18, a movable core member 19, a bridging contact member 20, and stationary contact members 21. One of the stationary contact members 21 is connected to the conductor 13 and the other stationary contact member 21 is connected to one of the stationary contact members 22 of a relay 23. The other stationary contact member 22 of the relay 23 is operatively connected to the movable contact member 24 of a switch 25 and to the stationary contact member 26 of a time-limit relay 27. The other stationary contact member 26 of the relay 27 is connected to one terminal of its winding 28, the other terminal of which is connected to one terminal of the electromagnet 7. The other terminal of the electromagnet 7 is connected to the conductor 16 of the circuit 14. Thus, when the circuit interrupter 5 is tripped, the voltage of the load end of the circuit 4 will drop substantially to zero, and the movable core member 19 of the relay 17 will move downwardly to cause its contact member 20 to engage the stationary contact members 21, thereby completing the circuit through the electromagnets for the purpose of reclosing the interrupter 5.

The time-limit overload relay 12 comprises the winding 10, a dash pot or other suitable time-element device 29, a movable bridging contact member 30 and stationary contact members 31. One of the stationary contact members 31 is operatively connected to the conductor 13 and the other stationary contact member 31 is operatively connected to one terminal of the winding 32 of the relay 23, the other terminal of which is operatively connected to the conductor 16.

The relay 23 is provided with a latching device 33 for the purpose of latching its movable core member 34 in such position, after the winding 32 is energized, that its movable contact member 35 shall be held out of engagement with its stationary contact members 22. Thus, when the relay 12 operates, it so energizes the relay 23 that a drop of voltage in the circuit 4 will not cause the electromagnet 7 to be actuated. In other words, the relay 23 is adapted to be energized if the overload has existed upon the circuit 4 for a predetermined period of time. The dash pot 29 of the relay 12 is, of course, so set that the circuit interrupter 5 may be tripped and reclosed a predetermined number of times before the contact member 30 engages the contact members 31. Consequently, in setting the time of operation of the relay 12 the time required to extinguish the arc by successively reducing the voltage thereacross must be taken into consideration.

The relay 27 is provided for preventing a continual energization of the winding of the electromagnet 7 in case the voltage of the generator 1 fails. A latch 47 is provided for so engaging the movable member of the relay 27 that it precludes its reclosing after it has once operated until it is manually reset. A switch 25 is provided in order that the circuit interrupter may be non-automatically reclosed under any condition.

If the circuit interrupter 3 were provided with the ordinary type of low-voltage tripping device, and the circuit interrupter 5 should be tripped by reason of the operation of the relay 9, the circuit interrupter 3 would be tripped and the motor or other translating device 36 would be disconnected from the circuit. Obviously, this is not desirable, as it is clear that no interruption in the service to the motor 36 should occur. In view of this, I provide a low-voltage tripping device 37 that comprises a winding 38, a stationary core member 39, an armature 40 and a dash pot 41 that is operatively connected, through a linkage mechanism 42, to the armature 40. The dash pot 41 is of such characteristics that, when the voltage impressed across the circuit 2 and, consequently, the winding 38, is reduced to zero, the time required for the armature 40 to so function as to release the operating lever 43 of the interrupter 3 will be equal to, or greater than, the time between the opening of the interrupter 5 and the reclosing of the same. In other words, when the interrupter is opened and reclosed for the purpose of extinguishing arcs in the circuit 4, the low-voltage tripping device 37 of the circuit interrupter 3 will not function to disconnect the motor 36 from the circuit 2, and, since the opening and closing operation of the circuit interrupter 5 is so timed that the motor 36 will not drop out of synchronism, the interruption of the arc may be accomplished without interrupting the service.

When an overload traverses the circuit 4, the relay 11 operates to trip the interrupter 5 through the electromagnet 6 and, at the same time, the relay 12 starts to operate. When the circuit interrupter 5 opens, the voltage on the load end of the circuit 4 and, consequently, on the load circuit 2, drops to zero to cause the core member 19 of the relay 17 to move downwardly. This will cause the electromagnet 7 to reclose the interrupter 5. If the arc that causes the overload upon the circuit 4 has been extinguished by reason of reduction of the voltage, nothing further will occur. However, if the arc persists, the relay 11 will again cause the interrupter to be tripped and, similarly, the relay 17 will again cause the interrupter to be reclosed. After the tripping and reclosing operations have occurred a number of times, dependent upon the time setting of the relay 12, the relay 23 will operate to prevent the automatic reclosing of the interrupter.

In Figs. 1 and 2 of the drawings, I have illustrated a circuit interrupter or controller of a well known type, the operating lever 43 of which is adapted to be held in its closed position when the armature 40 of the tripping device 37 is closed. That is, a pin 44 on the arm 43 is adapted to become wedged between an arm 45 of the armature and the main body portion of the armature itself. It will be readily seen that the armature 40 must move to its full open position before the pin 44 and, consequently, the lever 43, is released to permit a spring 46 to trip the interrupter.

I do not limit my invention to the particular system or circuit interrupter illustrated, as various modifications may be made therein without departing from the spirit and scope of the invention, as set forth in the appended claims.

I claim as my invention:

1. In a system of distribution, the combination with a load circuit, and a circuit interrupter for the load circuit, of means for reducing the voltage across the load circuit when a fault obtains thereon, and means for preventing the operation of the circuit interrupter for a sufficient interval of time to permit the voltage on the load circuit to be restored.

2. In a system of distribution, the combination with a load circuit and means for reducing the voltage on the system when a ground obtains thereon, of a circuit interrupter for the load circuit, a low-voltage trip coil therefor, and means for delaying the operation of the trip coil when the voltage is reduced on the system.

3. In a system of distribution, the combination with a load circuit and means for reducing and restoring the voltage on the system when a fault obtains therein, of a circuit interrupter for the load circuit, a low-voltage trip coil therefor, and means for so delaying the operation of the trip coil that the circuit interrupter is prevented from tripping during successive reductions and restorations of the voltage of the system.

4. In a system of distribution, the combination with a load circuit, and means for reducing and restoring the voltage of the system under predetermined conditions, of a circuit interrupter adapted to interrupt the load circuit when the voltage of the system is reduced, and means for delaying the operation of the interrupter an interval of time equal to the interval of time between the successive reduction and restoration of the voltage of the system.

5. In a system of distribution, the combination with a load circuit and means for reducing the voltage of the system to extinguish arcs that obtain therein, of a circuit interrupter for the load circuit, means tending to trip the interrupter when the voltage of the system is reduced to extinguish arcs therein, and a dash pot for retarding the operation of the said tripping means.

6. In a system of distribution, the combination with a load circuit, a main-circuit interrupter, a circuit interrupter for the load circuit, and means for tripping the main interrupter when a fault obtains on the system, of a low-voltage trip coil for the load-circuit interrupter, and means for delaying the operation of the trip coil to provide sufficient time to reclose the main interrupter.

In testimony whereof, I have hereunto subscribed my name this 21st day of August, 1917.

HENRY D. JAMES.